March 17, 1964 R. A. HERBRUCK 3,125,014
BREATHER BAG
Filed Feb. 13, 1961 2 Sheets-Sheet 1

INVENTOR.
ROBERT A. HERBRUCK
BY
Marshal, Biebel, French & Bugg
ATTORNEYS

March 17, 1964 R. A. HERBRUCK 3,125,014
BREATHER BAG
Filed Feb. 13, 1961 2 Sheets-Sheet 2
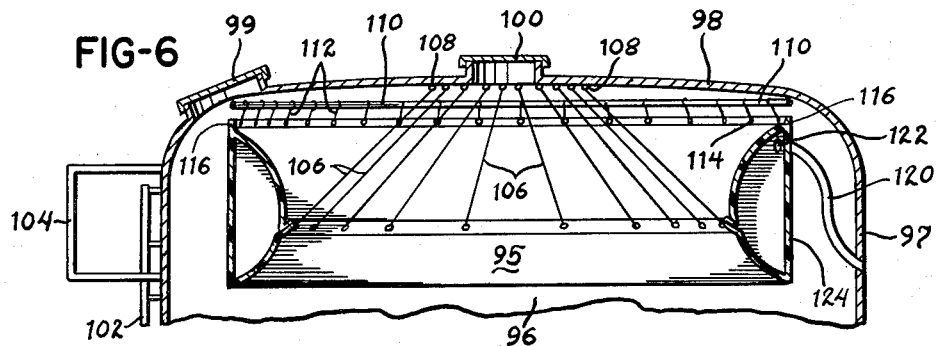
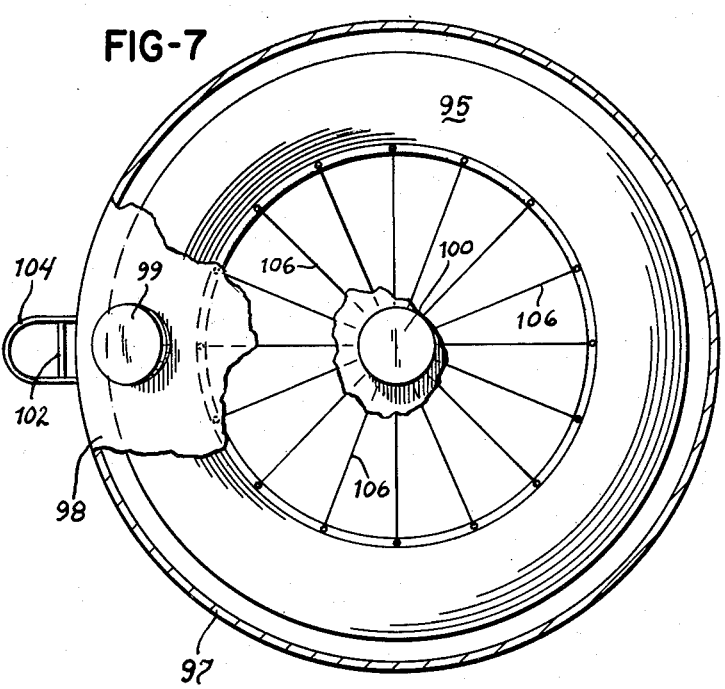
INVENTOR.
ROBERT A. HERBRUCK
BY
ATTORNEYS United States Patent Office 3,125,014
Patented Mar. 17, 1964

3,125,014
BREATHER BAG
Robert A. Herbruck, 151 Hadley Road, Dayton 9, Ohio
Filed Feb. 13, 1961, Ser. No. 88,992
6 Claims. (Cl. 99—235)

This invention relates to sealed receptacles for storing comestibles and non-comestible commodities and more particularly to a breather system adapted to compensate for relative changes of presssure within the sealed receptacle.

In storing agriculture crops, as, for example, corn, wheat, rice, peanuts, silage, grain, sorghum and the like, sealed storage containers are employed either to prevent a dehydrated crop from absorbing moisture from the surrounding atmosphere, or preventing decay or decomposition of stored material which has a high moisture content.

The use of sealed storage containers has many advantages especially in the storage of high moisture content materials such as high moisture shelled corn or grain sorghum which have become increasingly popular as cattle feed. The elimination of dehydrating procedures, in addition to cutting down processing costs, also makes available feed of high moisture content which thereby cuts down feeding costs. Additionally, early harvesting is possible resulting in a reduction in field loss, and the subsequent storage directly from the field to the sealed receptacle eliminates some of the handling expense.

When storing either the dry comestible or the high moisture comestible in a receptacle, such as a silo, a quantity of air is introduced into the receptacle during the filling procedure. The oxygen in the air reacts chemically with the stored material resulting in a fermentation thereof or oxidation with a resulting increase in the gas pressure within the container. If the container is open to atmosphere, oxygen is continually coming into contact with the stored material and in some instances may produce ruinous decay or decomposition. In the case of materials stored in the dehydrated state atmospheric moisture is absorbed, again resulting in loss due to decay and decomposition.

The use of a sealed receptacle eliminates to a great extent loss of the stored high moisture content material attributable to fermentation and decay or in the alternative loss of dry material which may decay due to moisture absorbed from the surrounding atmosphere. In either event, there is a build up of gas pressure within the container as a result of the fermentation or decomposition reaction which takes place between either the oxygen or water present in the air which is trapped in the sealed receptacle during sealing thereof.

This build up of pressure can actually become great enough to burst the container resulting in loss of both stored material and the sealed receptacle. The gases generated during fermentation are primarily carbon dioxide and nitrous oxide, each of which is noxious and constitutes a health hazaard. Even if the sealed container is so constructed as to withstand the initial build up of pressure resulting from the reaction as above mentioned, variations in temperature and pressure result in the creation of a pressure differential which may become sufficiently great to burst the sealed container or breather bag. Accordingly, it is desirable to provide a sealed receptacle wherein the reaction gases are contained therein, thereby to achieve an equilibrium wherein the rate of decay or fermentation is maintained at a minimum, and at the same time provide an apparatus which effectively compensates for the variations in pressure while facilitating examination, handling and installation thereof in an area not normally exposed to the noxious gases, as above described.

Thus it is a principal object of this invention to provide a sealed storage receptacle having an efficient breather apparatus which compensates for either a negative or positive pressure differential within the sealed receptacle and which maintains the decomposition gases therein to limit the amount of oxygen within the receptacle whereby the rate of decomposition of the stored material is kept at a minimum.

It is another object of this invention to provide a sealed storage receptacle wherein a breather apparatus is suspended within a portion of the receptacle structure in such manner that it is maintained in a partially expanded condition at such times when the pressure differential is zero and is adapted to expand and contract in accordance with the variations and temperature and pressure while maintaining the decomposition gases within the sealed receptacle thereby eliminating the introduction of atmospheric oxygen or moisture into the receptacle.

Another object of this invention is to provide a sealed receptacle wherein a breathing apparatus is suspended within a portion of the receptacle structure such that it is maintained in partially expanded condition when the pressure differential is zero and wherein easy and safe access is provided for workmen in an area not normally surrounded and exposed to noxious and hazardous gases.

A further object of this invention is to provide an expandable gas retaining envelope having eyelets formed along at least two surfaces thereof for enabling suspension of the envelope in a partially expanded condition.

Other objects and advantages of the present invention will be apparent from the following description, the accompanying drawings and the appended claims.

In the drawings:

FIG. 6 is a view of a further modification showing the installation of a breather bag constructed in accordance with this invention and placed in a modified form of silo; and FIG. 7 is a plan view of the suspension means for securing the breather bag as illustrated in either of FIGS. 4 and 5.

Figure 1:
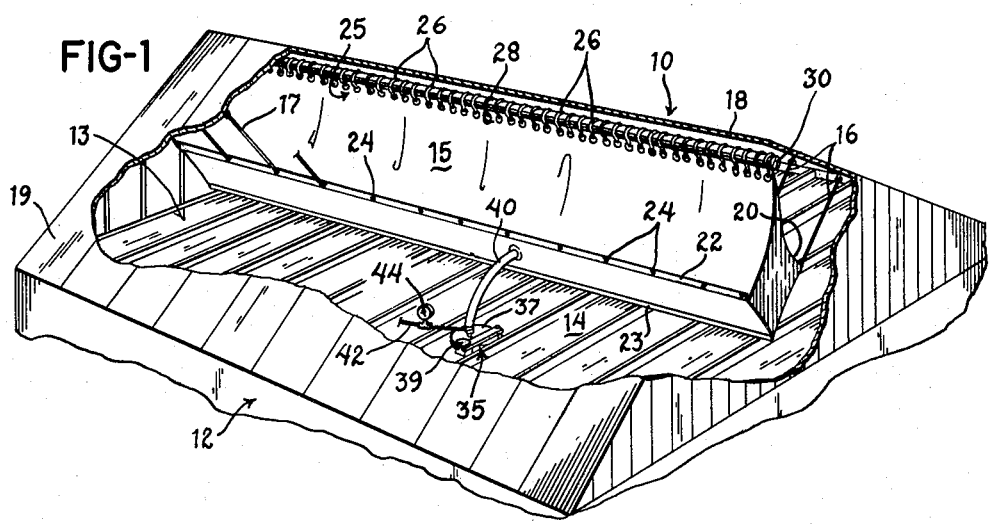
FIG. 1 is a view of a storage receptacle with portions of the roof broken away to show the location and suspension of the novel breather bag in accordance with the present invention.
Figures 2, 3:
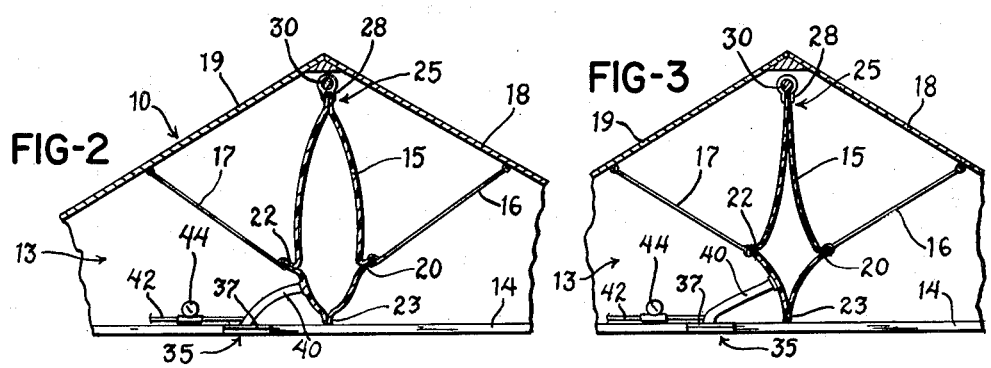
FIG. 2 is a view partly in section and partly in elevation as seen from the right of FIG. 1.
FIG. 3 is a view similar to that of FIG. 2 and showing the breather bag in a partially collapsed condition.

Referring to the drawings, which illustrate preferred embodiments of the present invention, FIGS. 1 and 2 show a generally rectangular storage receptacle 10 provided with a rectangular air tight storage container generally designated 12 and separated from the roof portion 13 by an upper ceiling member 14, the latter offering working or inspection platform open to atmosphere and sealed off from the presence of the toxic reaction gases. The roof or upper portion 13 of the receptacle 10 which is opened to surrounding atmosphere has mounted therein a breather bag 15 which extends approximately the full length of the receptacle. Provision is made for suspending the breather bag 15 formed of Neoprene coated nylon, vinyl, or other suitable material in partially expanded condition by means of two sets of guide wires or cables 16 and 17, each cable being spaced approximately 2 feet along each side of the breather bag 15 and having one end thereof fixed to roof members 18 and 19 respectively. The other end of each cable of the sets of cables or wires 16 and 17 is affixed to the breather bag along the seamed portions 20 and 22 which extend along the sides of the envelope approximately 18 inches from the lower end 23 of the bag.

The seamed portions 20 and 22 of the bag 15 are provided with one-half inch eyelets 24 therein spaced approximately 2 feet apart for securing the cables 16 and 17 thereto as illustrated. The upper portion 25 of the breather bag 15 is provided with a plurality of suspension hooks 26 spaced six inches apart and which extend through eyelets in the upper seamed portion 28 of the bag and are looped over a support rod 30 which is in turn affixed in the roof section 13 in any suitable manner.

The upper ceiling member 14 of the storage container is provided with a hatch generally designated 35 for filling purposes or for purposes of inspection. The hatch is provided with a hatch cover 37 which is retained in position by a suitable locking assembly generally designated 39 to maintain the cover in air tight sealing relationship thereon. A gas impervious flexible hose 40 interconnects the interior of the sealed storage chamber 12 to the breather bag 15 thereby providing passage of gas from the one to the other. An extension 42 is provided on the coupling between the hose 40 and the hatch cover 37 to which is affixed a pressure gage 44 indicating the pressure within the sealed storage chamber 12 and the breather bag 15.

In operation, the rectangular sealed storage chamber is filled through the hatch 35 or other suitable openings provided in the upper ceiling 14, thereafter the openings are sealed off to atmosphere and the hatch cover 37 is placed in sealing position with the hose connected to the bag 15 as shown in FIG. 1. The breather bag 15 is suspended in partially expanded condition or approximately one-third the total volume thereof by the guide cables 16 and 17. As the fermentation reaction takes place, pressure begins to build up as a result of the reaction gases and the breather bag 15 further expands to approximately one-half the total capacity thereof. Since the sealed storage chamber is no longer open to atmospheric oxygen and moisture, the fermentation reaction reaches an equilibrium point wherein the volume of gas present is altered only by changes in temperature and pressure or removal of stored material from the sealed container. The breather bag assembly is now effective to compensate for changes in pressure within the sealed storage chamber resulting either from changes in ambient temperature, pressure or both.

If for example, the interior temperature of the sealed storage chamber should increase as a result of heat caused by sunlight or increase in the ambient temperature, the pressure within the sealed storage chamber increases and gas flows into the breather bag 15 through the flexible connection 40 to cause expansion of the bag thereby maintaining a zero pressure differential between the interior of the storage chamber and atmospheric pressure. Since the breather bag is now in expanded condition and has changed its volume and amount proportionate to the increase of pressure within the sealed chamber, as the pressure drops within the sealed chamber, either due to a cooling of the gases therein or as a result of increase of ambient atmospheric pressure, gas will flow from the breather bag into the storage chamber and the bag will collapse as shown in FIG. 3 again maintaining the pressure differential approximately zero. Since the reaction gases fill both the expandable envelope 15 and the sealed chamber 12, little if any atmospheric moisture or oxygen enters the sealed storage space resulting in a significant reduction and substantial elimination of losses attributable to decay and decomposition.

Thus, the suspension system which maintains the breather bag in initially expanded condition whenever the pressure differential is zero also provides a breather bag arrangement which is capable of expansion or contraction in accordance with variaitons in the pressure either within or without the sealed chamber, thereby eliminating the need for pressure relief valves and the like, although it is understood that such valve may be employed if desired. Tests of a breather bag measuring twenty-four feet long and eight feet deep which was suspended as described above in a sealed storage bin measuring twenty-four feet by twenty-four feet by fourteen feet indicated that it is possible to maintain substantially a zero pressure differential in the bin under practically all conditions, since the bag is capable of expanding 200 cubic feet and contracting 200 cubic feet thus enabling a change in volume of 400 cubic feet. For large capacity storage containers, a larger capacity bag may be employed or additional envelopes may be added and suspended as above described.

Figure 4:
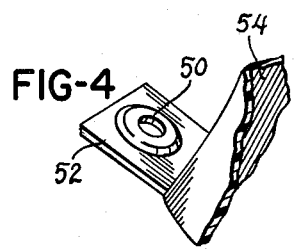
FIG. 4 is a view of a modification of the mounting attachment affixed to the breather bag.

A modified form for affixing the guide wires and cables to the breather bag is shown in FIG. 4 wherein an eyelet 50 is provided in a tab 52 which extends outwardly from the side of the breather bag 54 shown in fragmentary section. While the eyelet as shown in FIG. 4 provides an acceptable mode of suspending the breather bag in expanded condition, it is preferred to employ a breather bag provided with seams along each side such as 20 and 22 shown in FIG. 2 with the eyelets placed directly in the seamed portion, since this arrangement provides uniform expansion of the bag as well as eliminating uneven stresses along the portion of the bag to which the eyelets are affixed.

Figure 5:
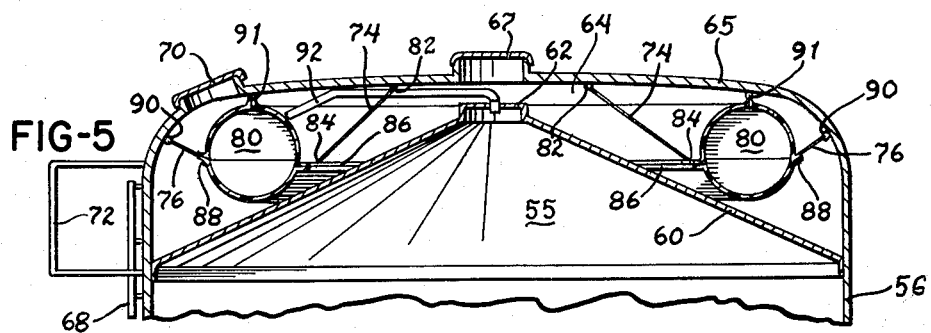
FIG. 5 shows a modified form of the breather bag adapted to be used in a silo provided with a conical ceiling therein.

A breather bag constructed in accordance with the principles of the present invention may also be employed in silo constructions as shown in FIG. 5 wherein a sealed receptacle 55 is defined by the cylindrical wall 56 and ceiling 60. The center of ceiling 60 is provided with a closure member 62 employed during the filling of the sealed receptacle 55 and which also may be used as an inspection hatch for examining the contents within the sealed receptacle. Located above the ceiling 60 and spaced therefrom to define a chamber 64 which is open to atmosphere, is a dome-shaped roof member 65 provided with a roof hatch 67 aligned with the closure member 62 enabling filling of the receptacle 55 by a hose which is inserted through the hatch 67 and closure member 62, as is well known in the art. Proximate the ladder 68 which is affixed along one side wall of the silo is an inspection hatch 70 conveniently located and readily accessible from the safety cage 72 provided in the area of the roof member 65.

Suspended by guide wires or cables 74 and 76 is a breather bag 80 of torodial configuration, although it is understood that an annular or circumferential breather bag may be employed. The envelope 80 is constructed of neoprene coated nylon, vinyl or other suitable material, to provide a gas impervious envelope adapted to expand and contract in accordance with the increase or decrease of pressure within the receptacle relative to atmospheric pressure.

The guide wires or cables 74 are affixed as at 82 to the underside of the roof and at the other end to eylet 84 provided in the seamed portion 86 which is formed along the inner circumference of the envelope 80 and which in construction resembles the seam and eyelet assembly shown in FIG. 2, although it is understood that the eyelet assembly as shown in FIG. 4 may be employed if desired. The outer circumference of the bag 80 is also provided with a seamed portion 88 having eyelets provided therein to which are attached cables 76, the latter having the other end attached to the roof member 65 as indicated at 90. These cables 74 and 76 serve to maintain the bag in partially expanded condition when the pressure differential is zero.

A third attachment is made between the bag and the roof as at 91 for suspending the bag within the chamber 64. Since the guide wires 74 are attached at 82, a point relatively close to the roof hatch 67, it is possible to gain easy access to the bag without becoming exposed to the noxious gases which are present in the receptacle 55, as was true in the case of the breather bag shown in FIGS. 1 and 2. Additionally, the convenient location of the suspending cables and guide wires facilitates adjusting the position of the bag or cell in containers where access to the chamber may not be possible or desirable due to the mechanical design and the inaccessibility thereof and such suspending means in addition to providing ready access also maintains the bag expanded as above disclosed.

A flexible conduit 92 is sealed into the closure member 62 at one end and sealed to the bag 80 at the other end, as illustrated, to provide passage of the gas to the interior of the receptacle 80 and the interior of the bag. In operation, the bag functions much in the same manner as disclosed above in connection with FIGS. 1 and 2.

A further modification of a breather bag constructed in accordance with the principles of the present invention is shown in FIG. 6 wherein the breather bag 95 is positioned within the sealed receptacle 96 which is provided with a cylindrical wall 97 and a generally dome-shaped roof member 98. The dome-shaped roof 98 is provided with an inspection hatch 99 and a fill hatch 100 which serve the same functions as did the inspection hatch and fill hatch of the silo shown in FIG. 5. To enable ready access to the inspection hatch 99, a ladder 102 and a safety cage 104 are provided along one side of the silo as along the side wall 97 for example.

The breather bag 95 is positioned in the upper portion of the sealed receptacle 96 and suspended from the roof in much the same manner as discussed in connection with the bag shown in FIG. 5, that is, by a plurality of cables 106 fixed to the roof member as at 108 in circumferential arrangement around the center fill hatch 100. Attached beneath the roof member 98 is a support bar 110 to which a plurality of hooks 112 are affixed, the other end of the hooks being placed through eyelets 114 provided along the upper seamed portion 116 of the envelope 95.

A flexible gas impervious coupling 120 is affixed at 122 to the flat side 124 of the envelope 95 to provide passage of gas from within the envelope through wall 97 and to atmosphere. Since the bag 95 is positioned within the sealed receptacle, the interior thereof is filled with air and the bag expands and contracts in accordance with variations in atmospheric pressure as well as pressure variations within the sealed container 96.

Referring to FIG. 7 which illustrates the manner of suspending the circumferential bag within a silo, it can be seen that ready access is provided for performing whatever manipulative operations are necessary for proper positioning and movement of the bag. While the reference numerals in FIG. 7 are the same as those used in FIG. 6, it is understood that in the plan view, the arrangement shown in FIG. 7 also represents the plan view of the breather bag installation shown in FIG. 5.

Whenever it becomes necessary to adjust or inspect the breather assembly, access thereto is easily provided through center hatch opening 100 or inspection hatch 99, each of which is conveniently located on the roof 98 and readily accessible from the ladder 102 and safety cage 104. By removing inspection hatch 99, access is provided to the peripheral portion of the bag, while removal of hatch 100 allows access to the guide wires 106 which terminate on the underside of the roof 98 in close proximity to the fill hatch 100.

Such convenient access is advantageous not only with the silo arrangement as shown in FIG. 5 wherein there is little, if any, problem of noxious gases, but also in the case of the silo as shown in FIG. 6, where it is possible to perform whatever manipulative steps that may be necessary without entering the sealed container by simply reaching through the hatch 100 or 99 while remaining a sufficient distance from the hatch so as to be removed from the influence of the noxious gases which are evolved each time hatch 100 or 99 is opened.

The operation of the breather assembly shown in FIG. 6 is similar in principle to that shown in FIGS. 1 and 5, for example, inasmuch as initial installation of the bag in partially expanded condition provides for expansion and contraction in accordance with the relative variations in pressure attributable either to change in atmospheric conditions or increase of pressure within the sealed receptacle.

Experience and tests have indicated that if the bag volume is approximately 4 to 15% the volume of the storage receptacle, satisfactory results may be obtained and the zero pressure differential may be maintained without the use of any additional apparatus such as a safety relief valve or a two-way valve which has heretofore been employed in some devices. In instances where a silo or storage container is constructed such that a large amount of heat is absorbed through the walls and roof thereof, it may be desirable to provide a safety relief valve which compensates for severe changes especially in instances where the structure itself is not sufficiently strong to withstand more than average pressure variations.

The breather bag assembly constructed in accordance with the above principles provides an assembly which is capable of expanding and contracting 200 to 250 cubic feet for a bag which has a total volume of 480 to 520 cubic feet, which is the size employed in a storage receptacle having an 8000 cubic feet storage capacity. In smaller storage receptacles, the bag may be scaled up or down a corresponding amount, and it is preferred for average conditions that the expanded volume of the bag be approximately 5 to 7% total volume of the receptacle. Due to the fact that the bag is initially installed in the expanded condition, it is possible to employ a bag which takes up little room and yet provides an effective assembly for compensating for pressure variations. Moreover, the use of guide wires and cables allows the suspension of the bag in the upper portion of the storage structure thereby increasing the space available for storage of commodities.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. In a storage container provided with a non-movable roof and stationary side walls and wherein at least a portion of said container includes an air tight storage receptacle for receiving and maintaining commodities in a pressure compensated controlled atmosphere, a breather system comprising means defining a substantially completely flexible variable volume chamber impervious to gases and variable between a predetermined minimum and maximum volume, said chamber having external and internal surfaces, one of said surfaces being exposed to ambient atmospheric pressure and the other being exposed to pressure within said storage receptacle, and means suspending said chamber beneath said roof in a condition between said minimum and maximum volumes to allow expansion and contraction of said chamber as the atmospheric pressure varies relative to the pressure in said storage receptacle whereby the interior of said storage receptacle is maintained sealed from atmospheric oxygen.

2. In a receptacle having a roof portion open to atmosphere and a storage container and means dividing said receptacle into said roof portion and said storage container, and wherein said storage container is provided beneath said roof portion for receiving commodities to be stored in an atmosphere containing a minimum amount of atmospheric oxygen, the combination comprising a gas receiving substantially completely flexible envelope positioned within said receptacle, said means sealing said storage chamber from atmosphere and including means connecting the interior of said envelope to the interior of said storage container for transmitting gas from the one to the other, and means for suspending said envelope in partially expanded condition above said sealed storage container when the pressure differential is zero, said envelope being responsive to variations in pressure within said storage container relative to ambient atmospheric pressure for increasing and decreasing the effective volume of said storage container in an amount proportionate to the amount of said pressure variation.

3. In a container for storing commodities in a controlled atmosphere, the combination comprising an air tight storage receptacle of generally rectangular configuration and provided with a stationary ceiling member, a stationary roof member positioned above said storage receptacle and defining a roof portion open to atmosphere above said storage receptacle, an expandable substantially completely flexible gas retaining envelope positioned within said roof portion and above said ceiling member, suspension means maintaining said gas retaining envelope in partially expanded condition above said ceiling member, and means removably affixed to said ceiling member connecting the interior of said storage receptacle to the interior of said expandable envelope for transmitting gas from the one to the other, whereby said envelope expands and contracts in accordance with the variations in pressure within said sealed receptacle relative to atmospheric pressure to maintain the pressure differential therebetween approximately zero.

4. In a silo construction for storing commodities in a controlled atmosphere, the combination comprising a sealed receptacle for storage of said commodities including a ceiling member, a roof member on said receptacle cooperating with said ceiling member to form a chamber open to atmosphere, an expandable substantially completely flexible gas retaining envelope of generally annular configuration positioned within said chamber, gas conducting means interconnecting the interior of said sealed receptacle to the interior of said expandable gas retaining envelope, and suspension means affixed to said roof member and to said envelope at at least two points for maintaining said gas retaining envelope in partially expanded condition above said ceiling member, whereby said gas retaining envelope expands and contracts in accordance with the variations in pressure within said sealed receptacle relative to atmospheric pressure to maintain the pressure differential therebetween approximately zero.

5. In a silo construction for storing commodities in a controlled atmosphere, the combination comprising a sealed chamber for storage of said commodities defined by a generally dome-shaped roof and a cylindrical wall section, an expandable substantially completely flexible gas retaining envelope of generally annular configuration positioned within said sealed chamber, gas conducting means interconnecting the interior of said envelope to atmosphere, and suspension means affixed to said roof member and maintaining said gas retaining envelope in partially expanded condition in the upper portion of said storage chamber, whereby said envelope contains therein atmospheric gases and is responsive to relative changes in pressure between said chamber and atmosphere for expanding and contracting an amount proportionate to said change for maintaining the pressure differential therebetween approximately zero.

6. In a breather system for use with a storage receptacle provided with a roof member wherein commodities are stored in a pressure compensated chamber, the combination comprising a substantially completely flexible gas impervious envelope capable of expanding from a minimum volume to a maximum volume in the expanded condition of approximately 4 to 15% the volume of said chamber, at least first and second suspension means located along first and second portions of said envelope, and means secured to said first and second suspension means for positioning said envelope beneath said roof in initially partially expanded condition between said maximum and minimum volume to allow expansion and contraction in accordance to the relative variations in pressure between atmosphere and said pressure compensated chamber.

References Cited in the file of this patent
UNITED STATES PATENTS

| | | |
|---|---|---|
| 2,295,767 | Wiggins | Sept. 15, 1942 |
| 2,587,943 | Wiggins | Mar. 4, 1952 |
| 2,899,884 | Herbruck | Aug. 18, 1959 |